United States Patent [19]

Bomard et al.

[11] Patent Number: 5,912,422
[45] Date of Patent: Jun. 15, 1999

[54] METHOD FOR PURIFYING HYDROGEN BASED GAS MIXTURE USING A LITHIUM-EXCHANGED X ZEOLITE

[75] Inventors: Olivier Bomard, Guyancourt; Jérôme Jutard, La Riche; Serge Moreau, Velizy-Villacoublay; Xavier Vigor, Paris, all of France

[73] Assignee: L'Air Liquide, Societe Anonyme Pour L'Etude et L'Exploitation des Procedes Georges Claudes, Paris Cedex, France

[21] Appl. No.: 08/983,073

[22] PCT Filed: May 16, 1997

[86] PCT No.: PCT/FR97/00878

§ 371 Date: Jan. 21, 1998

§ 102(e) Date: Jan. 21, 1998

[87] PCT Pub. No.: WO97/45363

PCT Pub. Date: Dec. 4, 1997

[30] Foreign Application Priority Data

May 24, 1996 [FR] France .................. 96 06516

[51] Int. Cl.⁶ ............................ B01D 53/47
[52] U.S. Cl. ............... 95/96; 95/130; 95/139; 95/140; 95/143
[58] Field of Search ............ 95/96–98, 100–105, 95/130, 139–141, 143

[56] References Cited

U.S. PATENT DOCUMENTS

| | | | |
|---|---|---|---|
| 2,882,244 | 4/1959 | Milton . | |
| 3,140,933 | 7/1964 | McKee | 95/130 |
| 3,150,942 | 9/1964 | Vasan | 95/139 X |
| 3,430,418 | 3/1969 | Wagner | 55/25 |
| 3,702,525 | 11/1972 | Simonet et al. | 95/130 X |
| 3,986,849 | 10/1976 | Fuderer et al. | 95/130 X |
| 4,077,779 | 3/1978 | Sircar et al. | 95/139 X |
| 4,153,428 | 5/1979 | Saunders et al. | 95/143 X |
| 4,322,394 | 3/1982 | Mezey et al. | 423/244 |
| 4,381,189 | 4/1983 | Fuderer | 55/26 |
| 4,477,267 | 10/1984 | Reiss | 95/139 |
| 4,696,680 | 9/1987 | Ghate et al. | 95/139 X |
| 4,813,980 | 3/1989 | Sircar | 95/139 X |
| 4,859,217 | 8/1989 | Chao | 95/130 |
| 4,957,514 | 9/1990 | Golden et al. | 95/139 X |
| 4,963,339 | 10/1990 | Krishnamurthy et al. | 95/139 X |
| 4,964,888 | 10/1990 | Miller | 95/143 X |
| 5,013,334 | 5/1991 | Maurer | 95/139 X |
| 5,096,470 | 3/1992 | Krishnamurthy | 95/139 X |
| 5,133,785 | 7/1992 | Kumar et al. | 95/139 X |
| 5,152,813 | 10/1992 | Coe et al. | 55/26 |
| 5,203,887 | 4/1993 | Toussaint | 95/130 X |
| 5,203,888 | 4/1993 | Maurer | 95/143 X |
| 5,234,472 | 8/1993 | Krishnamurthy et al. | 95/139 X |
| 5,258,058 | 11/1993 | Coe et al. | 95/130 X |
| 5,258,060 | 11/1993 | Gaffney et al. | 95/130 X |
| 5,268,023 | 12/1993 | Kirner | 95/130 X |
| 5,294,247 | 3/1994 | Scharpf et al. | 95/139 X |
| 5,354,346 | 10/1994 | Kumar | 95/139 X |
| 5,464,467 | 11/1995 | Fitch et al. | 95/902 X |
| 5,489,327 | 2/1996 | Otsuka et al. | 95/139 X |
| 5,505,764 | 4/1996 | Fuentes | 95/139 X |
| 5,529,610 | 6/1996 | Watson et al. | 95/139 X |
| 5,531,808 | 7/1996 | Ojo et al. | 95/139 X |
| 5,658,370 | 8/1997 | Vigor et al. | 95/902 X |
| 5,672,195 | 9/1997 | Moreau et al. | 95/902 X |
| 5,674,311 | 10/1997 | Notaro et al. | 95/139 X |

*Primary Examiner*—Robert Spitzer
*Attorney, Agent, or Firm*—Young & Thompson

[57] ABSTRACT

Process for the separation of the hydrogen contained in a gas mixture contaminated by carbon monoxide and containing at least one other impurity chosen from the group consisting of carbon dioxide and saturated or unsaturated, linear, branched or cyclic $C_1$–$C_8$ hydrocarbons, comprising bringing the gas mixture to be purified into contact, in an adsorption region, with at least:

one first adsorbent selective at least for carbon dioxide and for $C_1$–C. hydrocarbons and one second adsorbent which is a zeolite of faujasite type exchanged to at least 80% with lithium, the Si/Al ratio of which is less than 1.5, in order to remove at least carbon monoxide (CO).

20 Claims, 4 Drawing Sheets

METHOD FOR PURIFYING HYDROGEN BASED GAS MIXTURE USING A LITHIUM-EXCHANGED X ZEOLITE

FIELD OF THE INVENTION

The invention relates to a process for the purification of hydrogen-based gas mixtures contaminated by various impurities, including carbon monoxide and at least one other impurity chosen from carbon dioxide and saturated or unsaturated, linear, branched or cyclic $C_1$–$C_8$ hydrocarbons.

The process of the invention makes it possible in particular to improve the conventional processes for the separation of hydrogen of PSA type, or pressure-swing adsorption processes, using zeolites as adsorbent.

BACKGROUND OF THE INVENTION

The production of high-purity hydrogen is of great interest industrially, the latter being widely used in many synthetic processes, such as hydrocracking, the production of methanol, the production of oxoalcohols and isomerization processes.

In the prior art, PSA processes have proved to be very efficient in the separation of gas mixtures and in particular in the production of pure hydrogen or oxygen from gas mixtures contaminated by various impurities. PSA processes take advantage of the adsorption selectivity of a given adsorbent for one or a number of the contaminating substances of the gas mixture to be purified.

The choice of the adsorbent is problematic: it depends, on the one hand, on the nature of the mixture to be treated. As a general rule, the adsorbents are selected according to their ability to adsorb and to desorb a specific compound. In fact, PSA processes involve the operation of pressure cycles. In a first phase, the adsorbent bed separates at least one constituent of the mixture by adsorption of this constituent on the adsorbent bed. In a second phase, the adsorbent is regenerated by lowering the pressure. At each new cycle, it is therefore essential for the desorption to be efficient and complete, so that there is an identical regenerated state at each new cycle. However, it is clear that this ability to adsorb and then desorb a specific constituent of a gas mixture is a function of the specific operating conditions of the PSA process envisaged and in particular of the temperature and pressure conditions.

A distinction must therefore be made between PSA processes intended for the production of oxygen, which generally operate at adsorption pressures of less than $5 \times 10^5$ Pa, and PSA processes intended for the production of hydrogen, which can involve adsorption pressures of between $5 \times 10^5$ and $70 \times 10^5$ Pa.

However, insofar as the mixture to be purified generally comprises more than one impurity, it is desirable for the adsorbent to be able to adsorb and then desorb not one alone but a number of these impurities.

In point of fact, the adsorption profile and selectivity for a given constituent are often influenced by the presence, in the gas mixture, of other impurities, this being due, for example, to possible competition or to poisoning of the adsorbent.

These various considerations account for the complexity of the problem of the optimization of PSA processes by improvement of the adsorbent.

Recent studies have shown that, in the case of mixtures containing nitrogen, oxygen, hydrogen, methane and argon or helium, lithium-exchanged zeolites make possible a marked improvement in the performance characteristics. The result in particular of the various research studies carried out is that the selection criteria to be taken into account in choosing the adsorbent are its nitrogen adsorption capacity, its nitrogen/oxygen selectivity, its mechanical strength (the packing of the adsorbent having to be possible over a certain height, without crushing) and the pressure drop occasioned, this naturally being the situation in the case of gas mixtures comprising both nitrogen and oxygen for the purpose of purification of the oxygen.

Reference will be made, for example, to documents U.S. Pat. No. 5,152,813 and U.S. Pat. No. 5,258,058 and to Patent Application EP-A-0,297,542, which describe the use of lithium-exchanged zeolites of type X in PSA processes intended for the production of oxygen.

The teaching of these documents, however, is not generally applicable to the purification of gas mixtures containing impurities of the carbon monoxide, carbon dioxide or $C_1$–$C_8$ hydrocarbon type, the presence of which modifies the profile for adsorption of nitrogen by the zeolite. In point of fact, these impurities are the most frequently encountered in PSA units for the purification of hydrogen.

Moreover, the adsorption pressures involved in the prior art cited, generally being well below $5 \times 10^5$ Pa, do not correspond to those generally used for PSA processes for the production of hydrogen.

Indeed, as regards the production of hydrogen from a hydrogen-based gas mixture containing CO, $CO_2$, $CH_4$, $NH_3$, $H_2S$, $N_2$ and $H_2O$ as impurities, document U.S. Pat No. 3,430,418 provides the combination of two types of adsorbent, the first, which is an active charcoal, removing $CH_4$, $CO_2$ and $H_2O$ and the second, which is a zeolite of type A containing calcium, making possible the removal of the nitrogen and carbon monoxide. Until now, so as to improve the performance characteristics of PSA processes for the production of hydrogen, and in particular with a view to obtaining a better hydrogen yield, the number and the arrangement of the adsorbent beds operating in parallel has essentially been varied. Documents U.S. Pat. No. 4,381,189 and FR-A-2,330,433 illustrate in particular such an approach.

SUMMARY OF THE INVENTION

The present invention is based on the discovery that the combination of a specific zeolite with at least one second adsorbent of silica gel, active charcoal or prefilter charcoal type makes possible the removal of impurities of the carbon monoxide, carbon dioxide, saturated or unsaturated, linear, branched or cyclic $C_1$–$C_8$ hydrocarbon and nitrogen type from a gas mixture containing hydrogen, while resulting in a significant increase in the productivity. As used here, the term productivity denotes the ratio of the volume of hydrogen produced, measured under standard temperature and pressure conditions, per hour and per volume or weight of adsorbent.

More specifically, the invention relates to a process for the separation of the hydrogen contained in a gas mixture contaminated by carbon monoxide and containing at least one other impurity chosen from the group consisting of carbon dioxide and saturated or unsaturated, linear, branched or cyclic $C_1$–$C_8$ hydrocarbons, which comprises bringing the gas mixture to be purified into contact, in an adsorption region, with at least:

one first adsorbent selective for at least carbon dioxide and $C_1$–$C_8$ hydrocarbons,
  and one second adsorbent which is a zeolite of the faujasite type exchanged to at least 80% with lithium and the Si/Al ratio of which is less than 1.5, in order to remove at least carbon monoxide (CO).

The process of the invention is more particularly appropriate for the removal of carbon monoxide from hydrogen-based gas mixtures containing, in addition, other impurities such as carbon dioxide or saturated or unsaturated, linear, branched or cyclic $C_1$–$C_8$ hydrocarbons of the methane, ethane, butane, propane, benzene, toluene or xylene type. Likewise, the gaseous nitrogen optionally present in the gas mixture is separated from the hydrogen by adsorption on the specific adsorbent bed employed in the process of the invention. Advantageously, at least part, and preferentially most, of the nitrogen optionally present in the gas mixture to be purified is removed by adsorption on a third adsorbent bed placed or interposed, that is to say "sandwiched", between the bed of the first adsorbent selective for at least carbon dioxide and $C_1$–$C_8$ hydrocarbons and the bed of the second adsorbent intended to remove mainly CO. The adsorbent constituting the third bed is preferably chosen from zeolites, such as zeolite 5A.

According to a preferred embodiment, the gas mixture contains carbon monoxide, carbon dioxide, methane, nitrogen and hydrogen.

Mention may be made, as gas mixtures which may be suitable, of the gas mixtures resulting from catalytic cracking units, thermal cracking units, catalytic reforming units or hydrotreating units.

The purity of the hydrogen resulting from the process of the invention is at least 99.999% when the gas mixture to be purified comprises more than 45% of gaseous hydrogen. However, this purity can reach up to 99.999999% or more, depending on the operating conditions involved and the amount of adsorbent used. The purification of a gas mixture containing less than 45% of gaseous hydrogen is undesirable, insofar as it would require an excessive amount of adsorbent and a disproportionate size of the plants in order to be able to achieve an acceptable purity. It goes without saying that the greater the proportion of hydrogen in a starting gas mixture, the greater will be the purity of the hydrogen recovered at the outlet of the adsorption region. The process of the invention is considered as giving the best results when the percentage of hydrogen in the gas mixture to be treated is at least 70%.

As a general rule, in the context of the invention, the adsorption region is maintained at a pressure of between $5 \times 10^5$ and $70 \times 10^5$ Pa during the operation of bringing the gas mixture to be purified into contact with the first and second adsorbents. However, a higher pressure does not adversely affect the management of the purification. However, with a concern to save energy and because of the high cost of pressure-resistant plants, pressures above $70 \times 10^5$ Pa are generally avoided. Pressures of less than $5 \times 10^5$ Pa are not usually employed for the production of hydrogen by adsorption of impurities on an adsorbent bed, for reasons of efficiency. The pressure prevailing in the adsorption region will preferably be maintained at a value of less than $50 \times 10^5$ Pa, better still less than $30 \times 10^5$ Pa. The adsorption region is likewise preferably maintained above $5 \times 10^5$ Pa, preferentially above $15 \times 10^5$ Pa.

The temperature of the incoming gas mixture and of the adsorption region is not determining and is generally kept constant during the phase of adsorption of the impurities. This temperature is usually between 0 and 50° C., preferably between 30 and 45° C., during the adsorption.

The first and second adsorbents are arranged in the adsorption region so that the gas mixture passes through them one after the other. It has been found that the efficiency of the separation could be optimized by placing, at the inlet of the adsorption region, the adsorbent selective at least for carbon dioxide and for $C_1$–$C_8$ hydrocarbons and, at the outlet of the adsorption region, the adsorbent of faujasite type containing lithium intended to remove at least CO.

This result can be explained by the fact that the efficiency of adsorption of the zeolite of faujasite type is increased once the impurities of $C_1$–$C_8$ hydrocarbon and carbon dioxide type have been halted by the first adsorbent.

Use may be made, as adsorbent selective at least for carbon dioxide and for $C_1$–$C_8$ hydrocarbons, of an active charcoal, a prefilter charcoal, a silica gel or a mixture of these various adsorbents in any proportion. When such a mixture is chosen, it is preferable to arrange the various constituents of the mixture, in the adsorption region, in the form of separate layers so that the gas mixture comes into contact with each layer in turn.

The silica gels which can be used according to the invention are those commonly used in the art. These gels are commercially available, in particular from Solvay (Sorbead gel). The prefilter charcoals are active charcoals of high porosity and low relative density. The active charcoals and prefilter charcoals are, for example, sold by Norit, Carbotech, Ceca, Pica or Chemviron.

The second adsorbent is advantageously a zeolite of faujasite type exchanged to at least 80% with lithium.

Zeolites are a group of hydrated natural or synthetic metallic aluminosilicates, the majority of which exhibit a crystalline structure. Zeolites differ from one another in their chemical composition, their crystalline structure and their physical properties. Zeolite crystals are schematically composed of interlinked $SiO_4$ and $AlO_4$ tetrahedra networks. A certain number of cations, for example cations of alkali metals and alkaline-earth metals, such as sodium, potassium, calcium and magnesium, enclosed within the crystal lattice, ensure the electrical neutrality of the zeolite.

The zeolites of faujasite type, also denoted in the art by zeolite X, are crystalline zeolites of formula:

$$(0.9 \pm 0.2) M_{2/n}O : Al_2O_3 : 2.5 \pm 0.5 \ SiO_2 : yH_2O$$

in which M represents an alkali metal or alkaline-earth metal, n is the valency of the metal M and y takes any value between 0 and 8, depending on the nature of M and the degree of hydration of the zeolite. Document U.S. Pat. No. 2,882,244 relates to this specific type of zeolite.

Zeolites X in which the Si/Al ratio is less than 1.5 are selected according to the invention. This ratio is preferably between 1 and 1.2, it being understood that a value of 1 is more particularly recommended.

Zeolites X are commercially available, in particular from the following companies: Byer, UOP, Ceca, Ueticon, Grace Davison or Tosoh. Zeolites 13X provided by these distributors are, in particular, appropriate as starting materials for the preparation of lithium-exchanged zeolites X which can be used according to the invention as adsorbent.

That said, the process of the invention is not limited to the use of commercial faujasites. The use of a zeolite with a higher or lower porosity than that of industrial zeolites X which are currently commercially available is not, for example, ruled out.

According to the invention, the zeolites can be in the form of crystalline powders or of agglomerates. Zeolite agglomerates are obtained conventionally by making use of standard agglomeration processes. The agglomerated zeolite can, for example, be prepared by mixing a crystalline zeolite powder with water and a binder (generally in the powder form) and then spraying this mixture onto zeolite agglomerates acting as agglomeration seed. During the spraying, the zeolite agglomerates are continuously rotated about themselves. This can be achieved by placing the agglomerates in a reactor rotating about itself around a rotational axis, the rotational axis preferably being inclined with respect to the vertical direction. By this process, commonly denoted in the art by "snowball" process, agglomerates in the form of balls are obtained. The agglomerates thus obtained are then subjected to firing at a temperature of between approximately 500 and 700° C., preferably at a temperature in the region of 600° C. The person skilled in the art can resort, as example of binder, to a clay, such as kaolin, silica or alumina. The agglomerated zeolite thus obtained, which comprises a binder, can be used in the preparation of binder-free agglomerated zeolite, which can also be used in the process of the invention. It is possible, so as to convert the binder into the zeolite phase, in fact to subsequently fire zeolite agglomerates containing binder, whereby, after crystallization, binder-free zeolite agglomerates are obtained.

According to the invention, the zeolites X which can be used as adsorbent are subjected to a subsequent treatment aimed at introducing lithium cations into the crystal lattice. This is achieved by ion exchange, a portion of the $M^+$ cations initially contained in the zeolite being exchanged with lithium cations.

The combination of the first and second adsorbents described above results in an improvement in the purification of the gas mixture containing hydrogen and in the overall productivity when the second adsorbent is a zeolite of faujasite X type exchanged to at least 80% with lithium.

Zeolite exchanged to at least 80% with lithium is understood to mean a zeolite in which at least 80% of the $AlO_2^-$ units are associated with lithium cations.

Any known process of the state of the art which makes it possible to end up with a zeolite of faujasite type exchanged to at least 80% with lithium can be employed.

Zeolites of faujasite type exchanged to more than 90% with lithium are more particularly preferred.

Before the zeolites containing lithium are used, they must be activated. According to the invention, activation of a zeolite is understood to mean its dehydration, that is to say the removal of the water of hydration contained in the zeolite. As a general rule, it is seen to that the partial pressure of water in the gas in contact with the zeolite is less than approximately $4 \times 10^4$ Pa, preferably $1 \times 10^4$ Pa, after activation. Processes for the activation of zeolites are known in the art. One of these methods consists in subjecting the zeolite to a pressure of approximately $1 \times 10^4$ Pa to $1 \times 10^6$ Pa while passing a stream of an inert gas through the bed of adsorbent composed of the zeolite and while heating the zeolite to a temperature of between 300 to 650° C. at a rate of temperature rise of approximately 0.1 to 40° C. per minute. As an alternative, the zeolite can be activated by maintaining it under a vacuum of approximately $1 \times 10^4$ Pa or less while heating the zeolite to a temperature of approximately 300 to 650° C. without having to resort to purging with an inert gas. Another alternative consists in activating the zeolite by a process using microwaves, as described in Document U.S. Pat. No. 4,322,394.

It is possible, in making use of the adsorbent bed, a priori to combine the first and second adsorbents in any ratio by weight. Nevertheless, it was possible to find that a ratio by weight of the first adsorbent selective at least for carbon dioxide and for $C_1-C_8$ hydrocarbons to the second adsorbent of zeolite type of between 10/90 and 85/15 is particularly advantageous from the viewpoint of the efficiency of the purification and of the overall productivity. It was possible to observe empirically that this ratio is ideally between 50/50 and 80/20, preferably between 60/40 and 80/20.

It is known, so as to produce hydrogen continuously, to arrange in parallel a number of adsorbent beds which are alternately subjected to a cycle of adsorption with adiabatic compression and of desorption with decompression.

Such plants are employed in particular in PSA pressure-swing adsorption processes. The treatment cycle to which each adsorbent bed is subjected comprises the stages consisting in:

a) passing a hydrogen-based gas mixture contaminated by carbon monoxide and containing at least one other impurity chosen from the group consisting of carbon dioxide and $C_1-C_8$ hydrocarbons into an adsorption region comprising at least:
one first adsorbent bed composed of a first adsorbent selective at least for carbon dioxide and for $C_1-C_8$ hydrocarbons and:
one second adsorbent bed composed of a second adsorbent which is a zeolite of faujasite type exchanged to at least 80% with lithium, the Si/Al ratio of which is less than 1.5, in order to remove at least CO;

b) desorbing the carbon monoxide and the other impurity or impurities adsorbed on the first and second adsorbents by setting up a pressure gradient and progressively lowering the pressure in the adsorption region, so as to recover the carbon monoxide and the other impurity or impurities via the inlet of the adsorption region; and c) raising the pressure in the adsorption region by introduction of a stream of pure hydrogen via the outlet of the adsorption region.

Thus, each adsorbent bed is subjected to a treatment cycle comprising a first phase of production of hydrogen, a second phase of decompression and a third phase of recompression.

It is clear that, by adjusting the operating conditions of stage a) in accordance with the preferred embodiments described above, the result is an improvement in the yield and productivity as well as an improvement in the purity of the hydrogen recovered at the outlet. Thus, the purification of a gas mixture containing more than 70% of hydrogen and comprising nitrogen, methane, CO and $CO_2$ as impurities will preferably be opted for, which mixture will be brought into contact with an adsorbent bed composed of active charcoal and of faujasite exchanged to more than 90% with lithium, the ratio by weight of the active charcoal to the faujasite preferably being between 50/50 and 80/20.

The adsorption region is preferably maintained at a temperature of between 0 and 80° C.

The capacity of the adsorbent bed is limited by the maximum size which can be used, either because of the mechanical strength of the individual adsorbent particles or because of the maximum size which can be used for shipping the containers containing the adsorbents. For this reason, the operation of 4 to 10 adsorbent beds arranged in parallel is standard in the art.

In order to optimize PSA processes, the phases of decompression and of compression of the various adsorbent beds are synchronized: it is in particular advantageous to introduce stages of pressure equalization between two adsorbent beds, one of these two beds being in the decompression phase and the other in the recompression phase.

BRIEF DESCRIPTION OF THE DRAWINGS

The invention is now described with reference to implementational Examples 1 and 2 and to the appended figures.

DETAILED DESCRIPTION OF THE INVENTION

Figure 1:
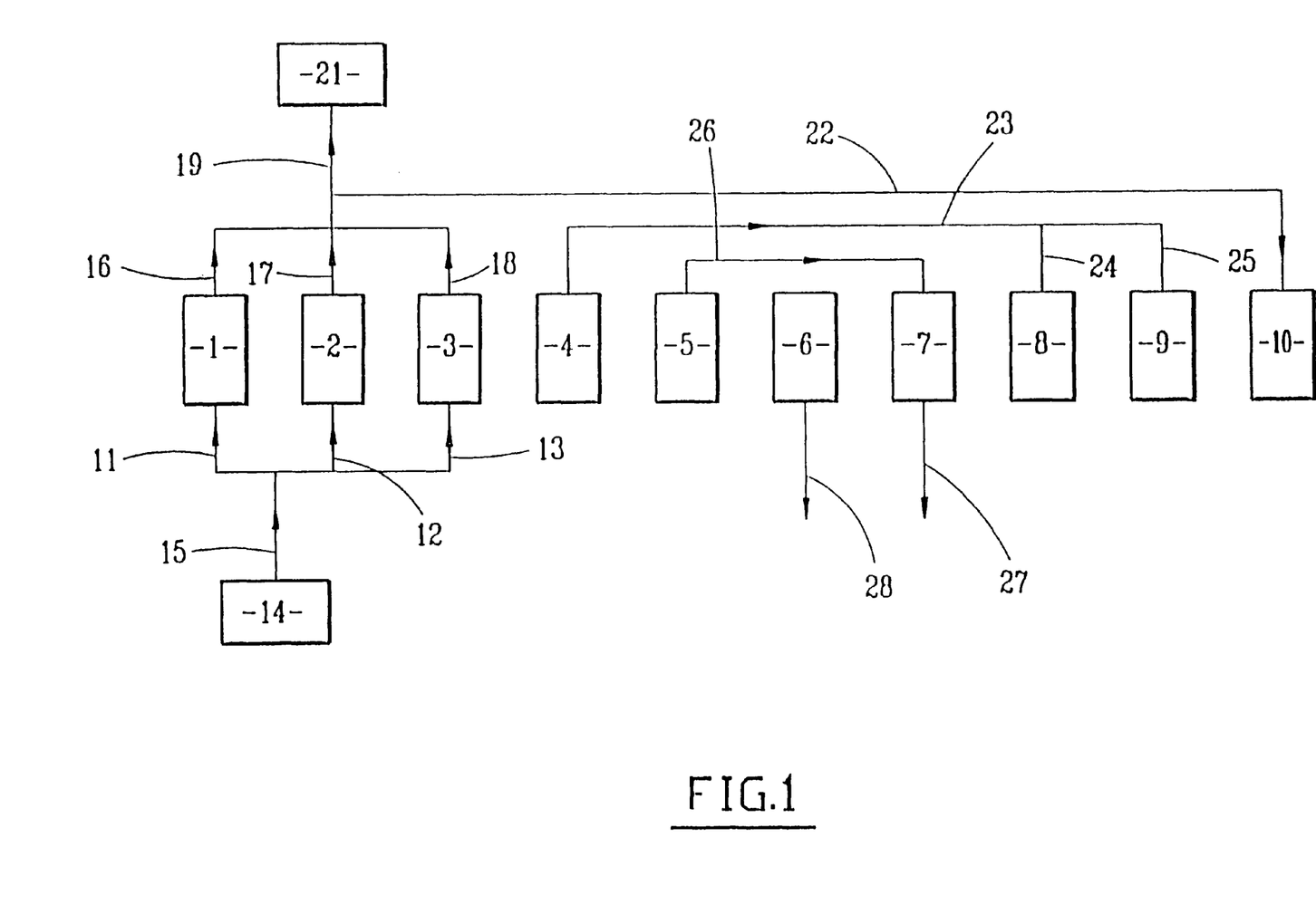
FIG. 1 represents diagrammatically a plant for the implementation of a PSA process for the production of hydrogen comprising ten adsorbent beds 1 to 10.

In FIG. 1, only the pipes through which hydrogen circulates, at a given moment, have been represented. More specifically, at the moment under consideration, the beds 1 to 3 are in the production phase, the beds 4 to 7 are in the decompression phase and the beds 8 to 10 are in the recompression phase.

The beds 1 to 3 are fed with the gas mixture to be purified via the pipes 11, 12 and 13 respectively. The pipes 11, 12 and 13 are each connected to a source of gas mixture 14 via one and the same pipe 15 into which the pipes 11, 12 and 13 run. The purified hydrogen is recovered at the outlet of the adsorption regions 1 to 3 via the pipes 16, 17 and 18.

All three of the pipes 16 to 18 run into a pipe 19 which conveys the purified hydrogen, coming from the pipes 16, 17 and 18, to a storage chamber 21 via the pipe 19. A portion of the hydrogen produced is withdrawn from the pipe 19 via the pipe 22 and conveyed to the adsorbent bed 10, which is then at the end of the recompression phase: the pressure is thus equalized between the adsorbent beds 1 to 3 in the production phase and the adsorbent bed 10 which is at the end of the treatment cycle.

During this same period, pressure equalization of the adsorbent beds 4 and 8, on the one hand, and 4 and 9, on the other hand, is carried out. To do this, the respective inlets of the adsorption regions 4, 8 and 9 are hermetically sealed. The adsorbent beds 4 and 8 are placed in communication with one another via a pipe 23. The adsorbent bed 4, entering into the decompression phase, is then under a relatively high hydrogen pressure, whereas the adsorbent bed 8, which is at the beginning of the recompression phase, is at a much lower pressure. As a result of the pressure difference existing between the adsorbent beds 4 and 8, hydrogen is driven from the adsorbent bed 4 to the adsorbent bed 8, which contributes to the recompression of the adsorbent bed 8 and to the concomitant decompression of the adsorbent bed 4. The pipe 23 runs more specifically into pipes 24 and 25, the pipe 24 being connected to the adsorbent bed 8 and the pipe 25 being connected to the adsorbent bed 9. Thus, via the pipes 23 and 25, the adsorbent beds 4 and 9 are also placed in communication with one another: in fact, pressure equalization of the adsorbent beds 4 and 8, on the one hand, and 4 and 9, on the other hand, is carried out simultaneously.

In the same way, pressure equalization between the adsorbent beds 5 and 7 is carried out, these two beds being placed in communication with one another via a pipe 26. Here again, insofar as the pressure prevailing within the adsorbent bed 5 is greater than the pressure prevailing within the adsorption region 7, the hydrogen flows from the adsorbent bed 5 to the adsorbent bed 7. This thus results in pressure equalization. Nevertheless, insofar as the adsorbent beds 5 and 7 are, in one case, in the course of decompression and, in the other case, at the end of the decompression phase, it is desirable not to equalize the pressures of these adsorption regions but, on the contrary, to lower the pressure prevailing in the adsorption region 7 with respect to the pressure prevailing in the adsorption region 5. This is achieved by allowing the excess hydrogen to discharge from the adsorption region 7 via the inlet 27 of the adsorption region 7.

The adsorbent bed 6 is also in the decompression phase. Its pressure is lowered simply by discharging the hydrogen via the inlet 28 of the adsorption region 6. It is at this decompression stage that the desorption of the impurities adsorbed on the adsorbent bed takes place.

EXAMPLES

In the following examples, two gas mixtures M1 and M2 are purified, the compositions of these gas mixtures being indicated in Table 1 below.

In this table, the percentages are percentages by volume.

TABLE 1

|    | $CH_4$ (%) | CO (%) | $CO_2$ (%) | $N_2$ (%) | $H_2$ (%) |
|----|------------|--------|------------|-----------|-----------|
| M1 | 3          | 3      | 22         | 2         | 70        |
| M2 | 3          | 3      | 22         | 0         | 72        |

To do this, a plant analogous to that described with reference to FIG. 1, comprising 10 adsorbent beds, is used.

Figure 2:
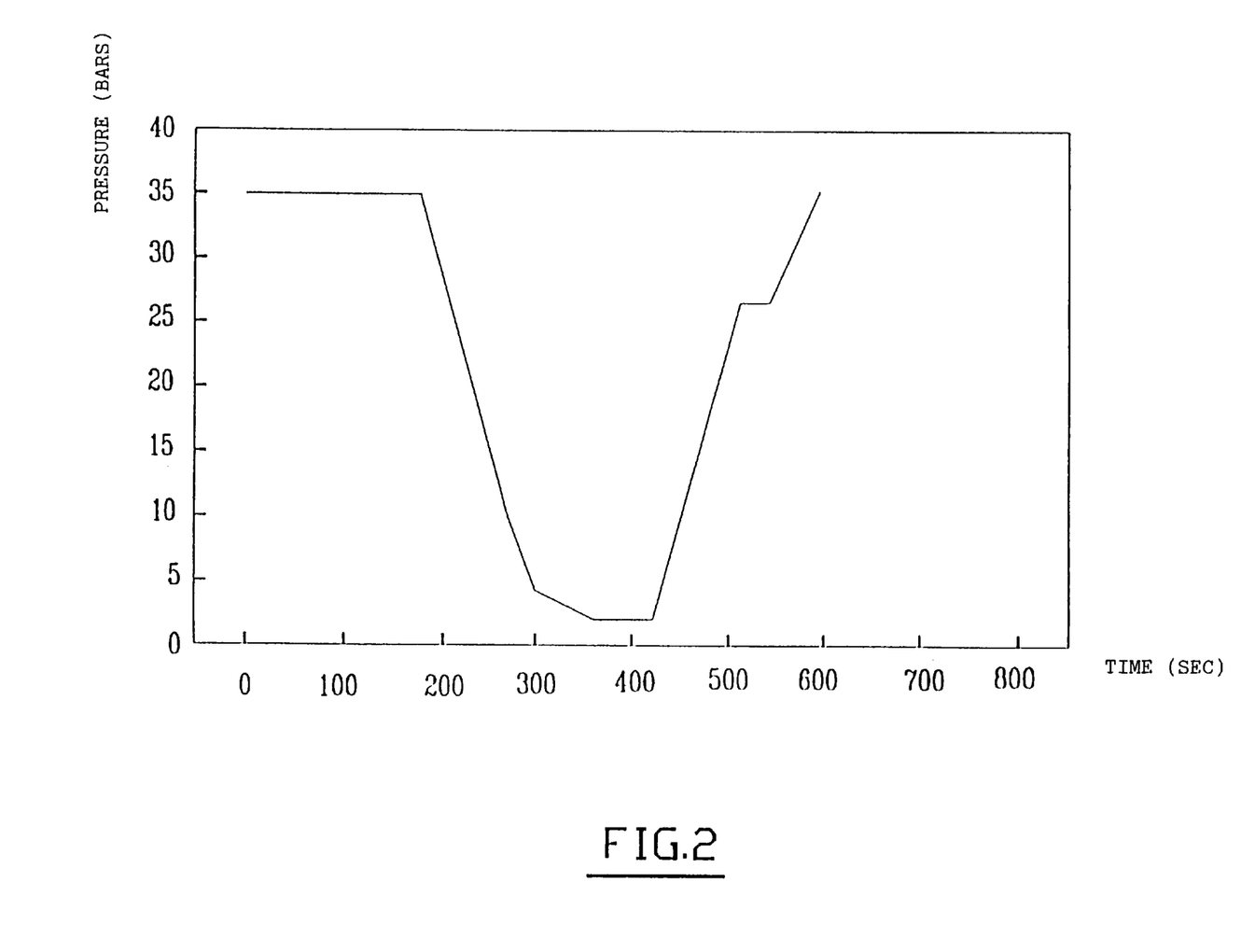
FIG. 2 represents the change in the pressure within an adsorption region during a treatment cycle for the purification of a hydrogen-based gas mixture by a PSA process.

The treatment cycle employed is shown diagrammatically in FIG. 2. More specifically, the change in the pressure within an adsorbent bed over the course of time has been represented in FIG. 2.

In all cases, the adsorbent beds are packed with active charcoal, on the one hand, and with a zeolite, on the other hand.

The active charcoal used is of the type of those generally employed in the various processes for the separation of hydrogen by pressure-swing adsorption ($PSA/H_2$).

In the case of Comparative Examples 1, 3 and 4, the zeolite is zeolite 5A sold by the company Procatalyse under the reference 5APS.

In the case of Comparative Example 2, the zeolite is zeolite 5A sold by the company layer under the reference Baylith K.

In the case of Examples 1 to 3 in accordance with the invention, the zeolite used is a zeolite X exchanged to 90% with lithium.

The zeolites Baylith K® (Bayer) and 5APS® (Procatalyse) are zeolites A containing, as exchangeable cations, $Na^+$ and $Ca^{2+}$ ions and exhibiting pores with a size of approximately 5 Å.

The zeolite 5APS®, which is in the form of extrusion products with a diameter of 1.6 mm and 3.2 mm, is additionally characterized by:

a loss on ignition of between 1 and 1.5% at 550° C.;

a bulk density of between 0.69 and 0.73 $g/cm^3$;

a specific heat of 0.23 $kcal.kg^{-1}.°C^{-1}$;

a heat of adsorption of water of at most 1000 kcal/kg;

a static adsorption of water of between 17.0 and 19 g of water per 100 g of adsorbent at a relative humidity of 10%, and a static adsorption of water of between 20 and 22 g of water per 100 g of adsorbent at a relative humidity of 60%.

The zeolite X exchanged to 90% with lithium is prepared in the following way, starting with a faujasite 13X exhibiting an Si/Al ratio of 1.25 and containing approximately 20% of binder:

A 1.94N aqueous lithium chloride solution containing 60 mmol/l of sodium chloride, the pH of which has been adjusted beforehand to 8 by addition of lithium hydroxide, is percolated through a column packed with 1 kg of the faujasite. During this operation, the column is maintained at a temperature of 95° C.

Figure 3:
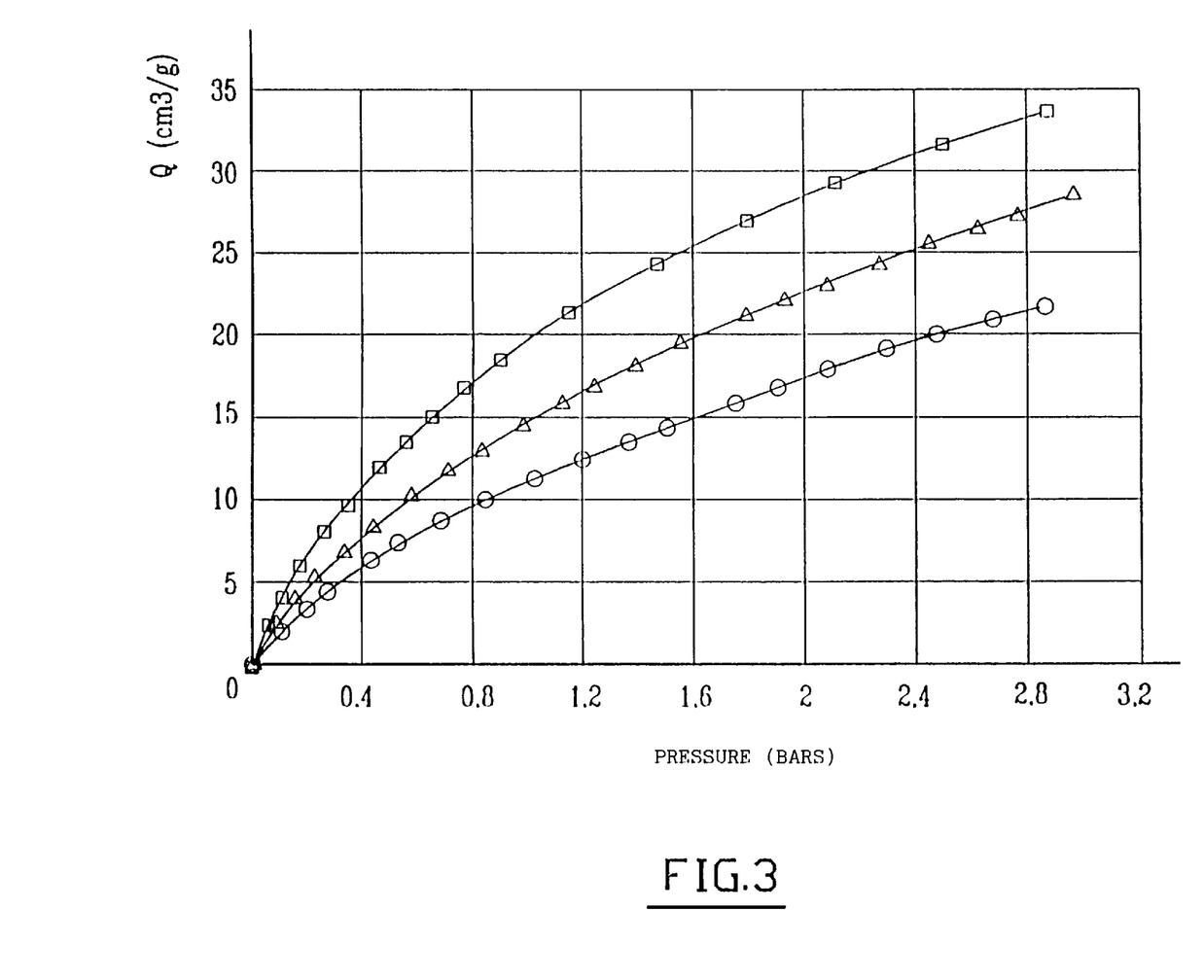
FIG. 3 represents the variations in the adsorption capacity of various zeolites as a function of the adsorption pressure.

The lithium-exchanged zeolite obtained is characterized by the isothermal curve passing through the points marked □ in FIG. 3. This isothermal curve was plotted at 20° C. by volumetric analysis by means of a Sorptomatic MS 190 apparatus from Fisons, after activation of the zeolite at 400° C. under vacuum for 8 hours.

More specifically, this curve represents the variations in the nitrogen adsorption capacity, expressed in cm$^3$ per gram, as a function of the adsorption pressure (expressed in bars).

Before they are placed in the various adsorption regions, the zeolites are activated under vacuum at 400° C. for 8 hours.

The active charcoal is placed at the inlet of the adsorption region, the lithium-exchanged zeolite of faujasite type being placed at the outlet of the adsorption region, so that these two adsorbents form two distinct superimposed layers.

The temperature of the adsorbent beds is maintained at 40° C.

A number of experiments are then carried out in order to test the efficiency of the process of the invention; in these experiments, the value of the adsorption pressure (achieved at the end of the compression phase) and the value of the desorption pressure (achieved at the end of the decompression phase) are modified and the resulting yield and resulting productivity are determined.

The productivity P is defined here as the ratio of the volume of hydrogen produced, measured under standard temperature and pressure conditions, per hour and per m$^3$ of adsorbent.

The yield Y of the process corresponds to the ratio of the volume of pure hydrogen produced, measured under standard temperature and pressure conditions, to the volume of hydrogen contained in the effluent gas to be purified, also measured under standard temperature and pressure conditions.

In the examples below, the yields and productivities reported in Tables 2 and 3 are relative yields and productivities.

In fact, Comparative Example 1 was chosen as reference, that is to say that, for this example, the relative yield and relative productivity were set at 100: this example illustrates more specifically the purification of the mixture M1 described in Table 1 in the presence of an adsorbent composed of 70% by weight of active charcoal and of 30% by weight of zeolite 5APS, the desorption pressure being set at 2×10$^5$ Pa and the adsorption pressure being 20×10$^5$ Pa.

Consequently, in the case of all the other examples, the relative yields and productivities $Y_r$ and $P_r$ are given respectively by the equations:

$$Y_r = \frac{Y \times 100}{Y_{c_1}} \text{ and } P_r = \frac{P \times 100}{P_{c_1}}$$

where Y and P are as defined above and $Y_{c_1}$ and $P_{c_1}$ are the true yield and true productivity respectively determined in the case of Comparative Example 1.

The results obtained in the case of the comparative examples have been reported in Table 2 below as a function of the pressure conditions selected and of the active charcoal/zeolite ratios by mass used:

TABLE 2

| Comparative Ex. | Zeolite | Active charcoal/zeolite ratio by mass | Gas mixture to be purified | Adsorption pressure (bars) | Desorption pressure (bars) | Relative yield | Relative productivity |
|---|---|---|---|---|---|---|---|
| 1 | 5APS | 70/30 | M1 | 20 | 2 | 100 | 100 |
| 2 | Baylith K | 70/30 | M1 | 20 | 2 | 96.1 | 98 |
| 3 | 5APS | 75/25 | M2 | 23 | 1.6 | 100 | 100 |
| 4 | 5APS | 75/25 | M2 | 33 | 1.6 | 100 | 100 |

The results obtained by using the lithium-exchanged zeolite in accordance with the process of the invention have been collected in Table 3 in the case of the following three examples:

TABLE 3

| Ex. | Active charcoal/zeolite containing Li ratio by mass | Gas mixture to be purified | Adsorption pressure (bars) | Desorption pressure (bars) | Relative yield | Relative productivity |
|---|---|---|---|---|---|---|
| 1 | 70/30 | M1 | 20 | 2 | 103.5 | 113.4 |
| 2 | 75/25 | M2 | 23 | 1.6 | 101.7 | 112.3 |
| 3 | 75/25 | M2 | 33 | 1.6 | 101.6 | 111.3 |

In the case of Examples 1 to 3, the purity of the hydrogen produced was 99.999%.

It clearly results from these results that the combination of active charcoal and of lithium-exchanged zeolite X leads to better values of the yield and the productivity.

The isothermal curves of variation in the nitrogen adsorption capacity in the case of each of the zeolites studied in Examples 1 to 3 and Comparative Examples 1 to 4, as a function of the adsorption pressure, are represented in the appended FIG. 3.

In these curves, the amount Q of nitrogen adsorbed (expressed in cm$^3$ per gram) has been given on the ordinates and the adsorption pressure (expressed in bars) has been given on the abscissae. The points relating to the lithium-exchanged zeolite of Examples 1 to 3 are marked □; the points relating to the zeolite A Baylith K® (Bayer) are marked ○ and the points relating to the zeolite A 5PAS® (Procatalyse) are marked Δ.

These curves were plotted at 20° C. by volumetric analysis by means of a Sorptomatic MS 190 apparatus from Fisons, after activation of the zeolites at 400° C. under vacuum for 8 hours.

It clearly results from these curves that the adsorption capacity of the zeolite containing lithium is greater. Likewise, the adsorption capacity of the zeolite Bylith K, sold by Bayer, is greater than that of the zeolite 5APS.

In point of fact, in the light of the results obtained above, the yield and productivity obtained in PSA processes for the production of hydrogen are the best for the lithium-exchange zeolite X and the worst in the case of the zeolite A Baylith K sold by Bayer.

It is thus demonstrated that the adsorption capacity of a zeolite for nitrogen, until now regarded as an important criterion in choosing the most efficient zeolite, does not have a direct relationship with the yield and productivity which are finally obtained in PSA processes for the production of hydrogen.

Figure 4:
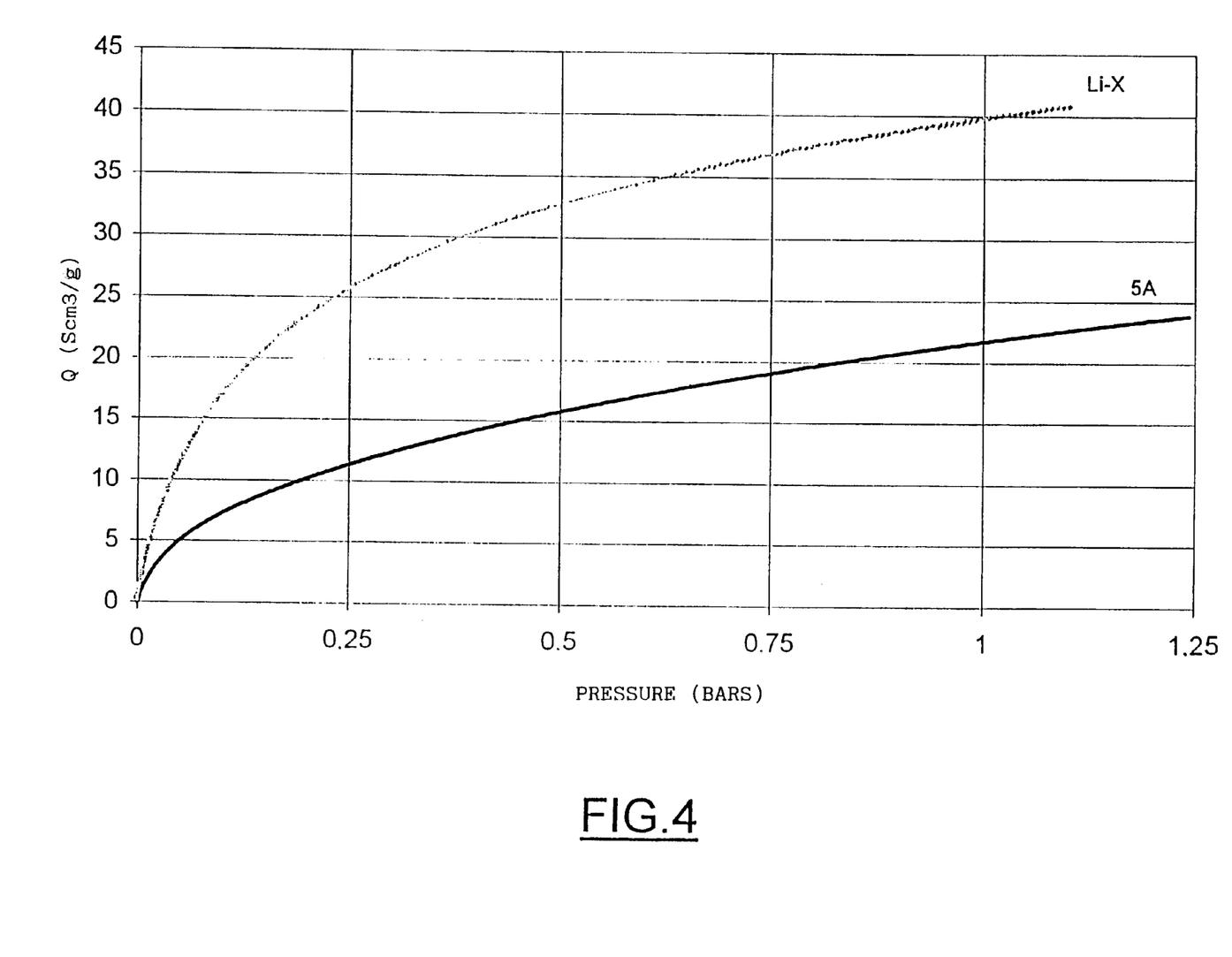
FIG. 4 represents variations in the adsorption capacity of a lithium-exchanged zeolite of type X according to the invention (curve LiX) and of a conventional zeolite 5A (curve 5A) as a function of the adsorption pressure.

The isothermal curves of variation in the carbon monoxide (CO) adsorption capacity of a zeolite of faujasite type exchanged to 87% with lithium according to the invention (curve LiX) and of a zeolite 5A (curve 5A) are represented in FIG. 4.

In these curves, the amount Q of carbon monoxide (CO) adsorbed (expressed in $Scm^3/g$) has been given on the ordinates and the adsorption pressure (expressed in bars) has been given on the abscissae; these measurements were carried out at 30° C.

These isothermal curves clearly show that the lithium-exchanged zeolite X (LiX) has, for a given pressure, a much higher adsorption capacity for carbon monoxide than the conventional zeolite of type 5A.

Likewise, it is found that the CO respiration of a lithium-exchanged zeolite X according to the invention is markedly superior to that of a conventional zeolite of type 5A. Indeed, the respiration of a zeolite is defined as the difference between the adsorption capacity for a pure gas by this zeolite at the high partial pressure, or adsorption pressure, and the adsorption capacity for the gas by the zeolite at the low pressure, or desorption pressure.

Consequently, for an adsorption pressure of 23 bar, a desorption pressure of 1.6 bar and a gas having a CO content of approximately 3%, a mean CO partial pressure in the adsorption phase (on zeolite) of approximately 0.69 bar is obtained and a pressure of approximately 0.24 bar was evaluated in the desorption phase.

Consequently, for a conventional zeolite of type 5A, the amount of CO adsorbed in the adsorption phase is approximately 18.3 $Scm^3/g$ and approximately 11.1 $Scm^3/g$ in the desorption phase, which corresponds to a respiration of approximately 7.2 $Scm^3/g$.

Analogously, for a lithium-exchanged zeolite X in accordance with the invention, the amount of CO adsorbed in the adsorption phase is approximately 35.9 $Scm^3/g$ and approximately 25.2 $Scm^3/g$ in the desorption phase, which corresponds to a respiration of approximately 10.7 $Scm^3/g$.

It thus immediately appears that to use a lithium-exchanged zeolite in place of a conventional zeolite of type 5A makes it possible to obtain, surprisingly, a respiration in the case of carbon monoxide (CO) which is improved by approximately 48%.

The industrial and commercial advantage of the process of the present invention is thus convincingly demonstrated.

We claim:

1. Process for the separation of hydrogen contained in a gas mixture contaminated by carbon monoxide and containing at least one other impurity selected from the group consisting of carbon dioxide and saturated or unsaturated linear, branched or cyclic $C_1$–$C_8$ hydrocarbons, which comprises bringing the gas mixture to be purified into contact, in an adsorption region, with at least:
    one first adsorbent selective at least for carbon dioxide and for $C_1$–$C_8$ hydrocarbons, and
    one second adsorbent which is a faujasite zeolite exchanged to at least 80% with lithium, and having a Si/Al ratio which is less than 1.5, in order to remove carbon monoxide.

2. Process according to claim 1, wherein the gas mixture to be purified contains more than 45% of gaseous hydrogen.

3. Process according to claim 1, wherein the gas mixture to be purified contains more than 70% of gaseous hydrogen.

4. Process according to claim 1, wherein the gas mixture additionally comprises nitrogen as an impurity.

5. Process according to claim 4, wherein at least a portion of the nitrogen is adsorbed on at least one third adsorbent placed between the first and second adsorbents.

6. Process according to claim 5, wherein the third adsorbent is a zeolite.

7. Process according to claim 5, wherein the third adsorbent is a 5A zeolite.

8. Process according to claim 1, wherein the gas mixture additionally contains nitrogen.

9. Process according to claim 1, wherein the adsorption region is maintained under a pressure of between $5\times10^5$ and $70\times10^5$ Pa.

10. Process according to claim 1, wherein the adsorption region is maintained under a pressure of between $15\times10^5$ and $30\times10^5$ Pa.

11. Process according to claim 1, wherein the gas mixture to be purified is first brought into contact with the first adsorbent selective for carbon dioxide and for $C_1$–$C_8$ hydrocarbons, and then, in a second step, with the second adsorbent of faujasite zeolite containing lithium.

12. Process according to claim 1, wherein the first adsorbent selective for carbon dioxide and for $C_1$–$C_8$ hydrocarbons is an active charcoal, a prefilter charcoal, a silica gel or a mixture thereof.

13. Process according to claim 1, wherein the faujasite zeolite is exchanged to at least 90% with lithium.

14. Process according to claim 1, wherein the Si/Al ratio of the faujasite zeolite is between 1 and 1.2.

15. Process according to claim 1, wherein the Si/Al ratio of the faujasite zeolite is equal to 1.

16. Process according to claim 1, wherein the ratio by weight of the first adsorbent to the second adsorbent is between 10/90 and 85/15.

17. Process according to claim 1, wherein the ratio by weight of the first adsorbent to the second adsorbent is between 50/50 and 80/20.

18. Process for carrying out a treatment cycle comprising the stages consisting in:
    a) passing a hydrogen-based gas mixture contaminated by at least carbon monoxide and containing at least one other impurity selected from the group consisting of carbon dioxide and $C_1$–$C_8$ hydrocarbons into an adsorption region comprising at least:
    one first adsorbent bed composed of a first adsorbent selective for at least carbon dioxide and $C_1$–$C_8$ hydrocarbons and,
    one second adsorbent bed composed of a second adsorbent which is a faujasite zeolite exchanged to at least 80% with lithium, and having a Si/Al ratio which is less than 1.5, for adsorbing carbon monoxide;
    b) desorbing the carbon monoxide and the other impurity or impurities adsorbed on said at least first and second adsorbents by setting up a pressure gradient and progressively lowering the pressure in said adsorption region, so as to recover the carbon monoxide and the other impurity or impurities via an inlet of said adsorption region; and
    c) raising the pressure in said adsorption region by introducing a stream of pure hydrogen via an outlet of the adsorption region.

19. Process according to claim 18, wherein in stage a), the adsorption region is maintained under a pressure of between $5\times10^5$ and $70\times10^5$ Pa, and at a temperature of between 0 and 80° C.

20. Process according to claim 18, wherein in stage a), the adsorption region is maintain under a pressure of $15\times10^5$ and $30\times10^5$ Pa, and at a temperature of between 0 and 80° C.

* * * * *